(12) United States Patent
Kim et al.

(10) Patent No.: US 11,427,112 B2
(45) Date of Patent: Aug. 30, 2022

(54) MOVING AND LOCKING DEVICE FOR VEHICLE SEAT

(71) Applicants: HYUNDAI MOTOR COMPANY, Seoul (KR); KIA MOTORS CORPORATION, Seoul (KR)

(72) Inventors: Mu Young Kim, Hwaseong-si (KR); Sang Do Park, Suwon-si (KR); Jun Young Yun, Osan-si (KR); Jun Hwan Lee, Seoul (KR); Chan Ho Jung, Gunpo-si (KR); Ho Suk Jung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/169,801

(22) Filed: Feb. 8, 2021

(65) Prior Publication Data

US 2022/0063454 A1    Mar. 3, 2022

(30) Foreign Application Priority Data

Aug. 31, 2020 (KR) .................... 10-2020-0109973

(51) Int. Cl.
| | |
|---|---|
| *B60N 2/16* | (2006.01) |
| *B60N 2/14* | (2006.01) |
| *B60N 2/06* | (2006.01) |
| *B60N 2/02* | (2006.01) |

(52) U.S. Cl.
CPC ......... *B60N 2/1625* (2013.01); *B60N 2/0232* (2013.01); *B60N 2/067* (2013.01); *B60N 2/146* (2013.01); *B60N 2/164* (2013.01); *B60N 2/1685* (2013.01)

(58) Field of Classification Search
CPC .... B60N 2/1625; B60N 2/0232; B60N 2/067; B60N 2/146; B60N 2/164; B60N 2/1685
USPC ..................................................... 297/344.13
See application file for complete search history.

(56) References Cited

U.S. PATENT DOCUMENTS

2004/0018325 A1    1/2004  Adjeleian

FOREIGN PATENT DOCUMENTS

| | | |
|---|---|---|
| EP | 1295752 A2 | 3/2003 |
| JP | H10-138806 A | 5/1998 |
| JP | 2018-0202665 A | 2/2018 |
| KR | 10-1998-0020760 A | 6/1998 |
| KR | 20-0226082 B1 | 3/2001 |

*Primary Examiner* — Mark R Wendell
(74) *Attorney, Agent, or Firm* — Morgan, Lewis & Bockius LLP

(57) ABSTRACT

A moving and locking device for a vehicle seat includes: a lower frame mounted on a bottom surface of a seat cushion; a plurality of wheels disposed underneath the lower frame in such a manner that the plurality of wheels roll on a floor panel; and a vacuum adsorption device disposed inside the lower frame and configured to be adsorbed on the floor panel by vacuum force. The vehicle seat is configured to be moved to the desired position through the rolling motion of the plurality of wheels, and configured to be locked at the desired position through vacuum adsorption of the vacuum adsorption device on the floor panel.

10 Claims, 4 Drawing Sheets

[FIG. 1]
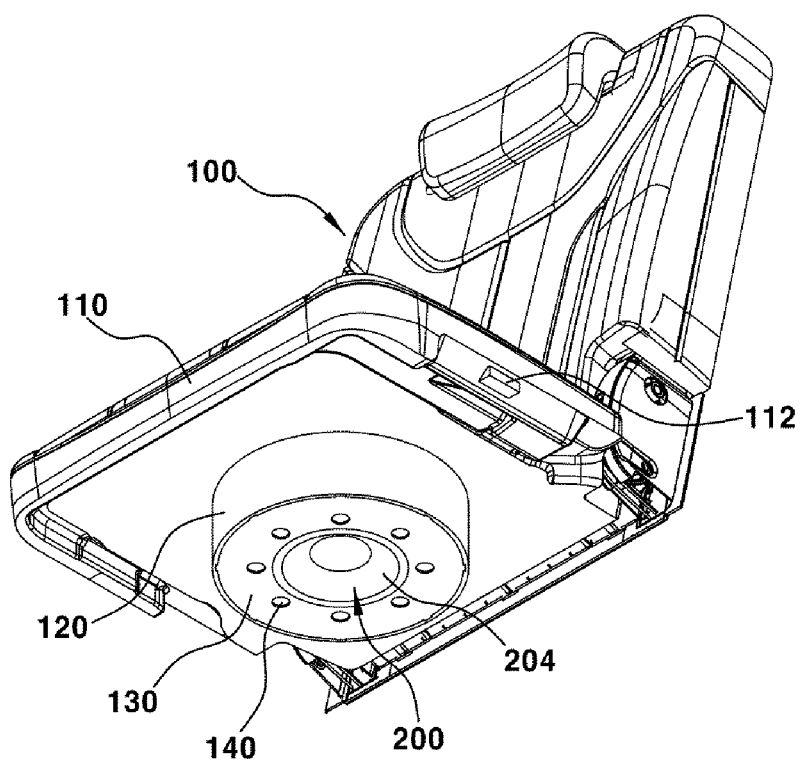

[FIG. 2]
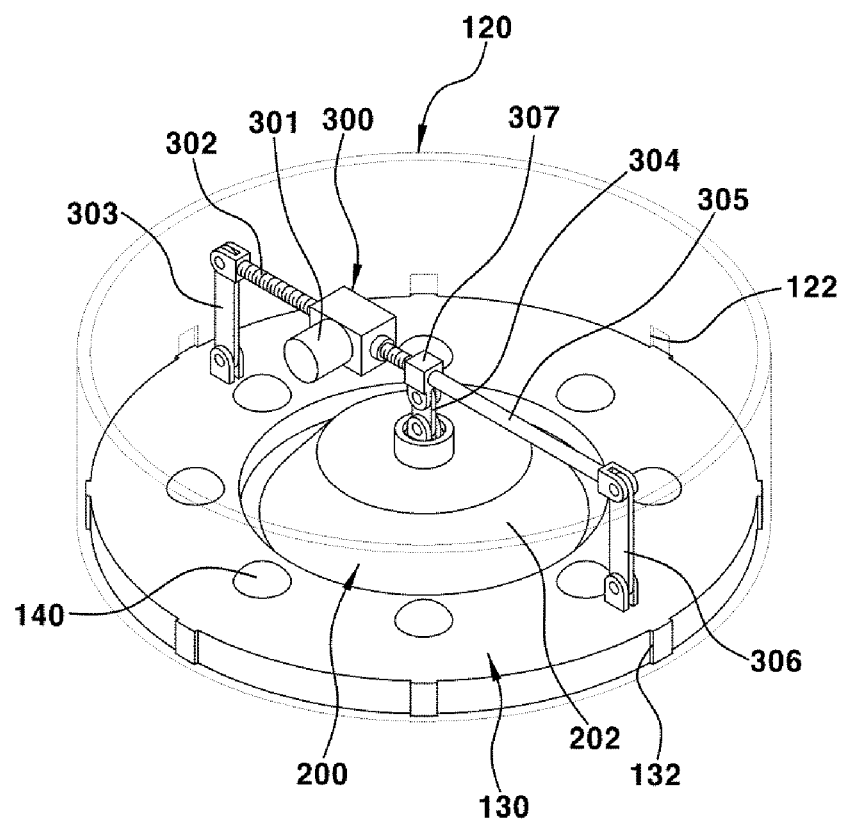

[FIG. 3]
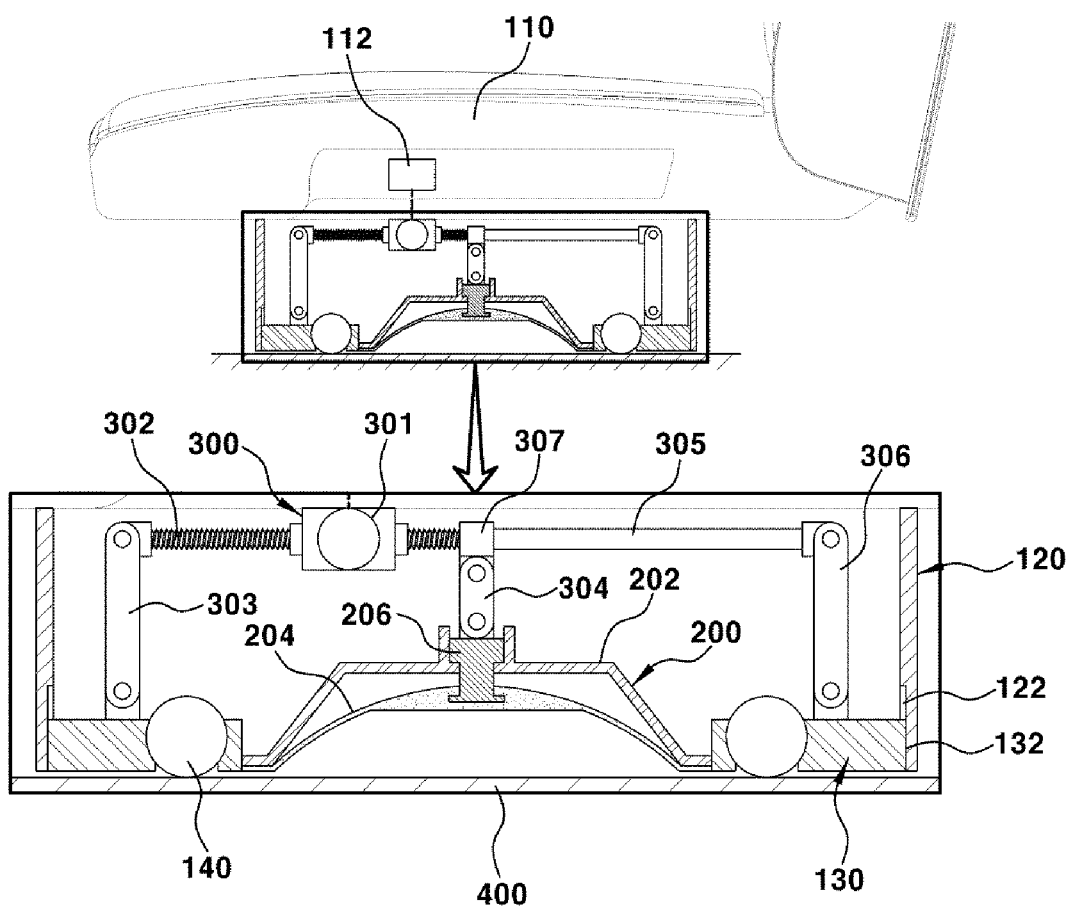

[FIG. 4]
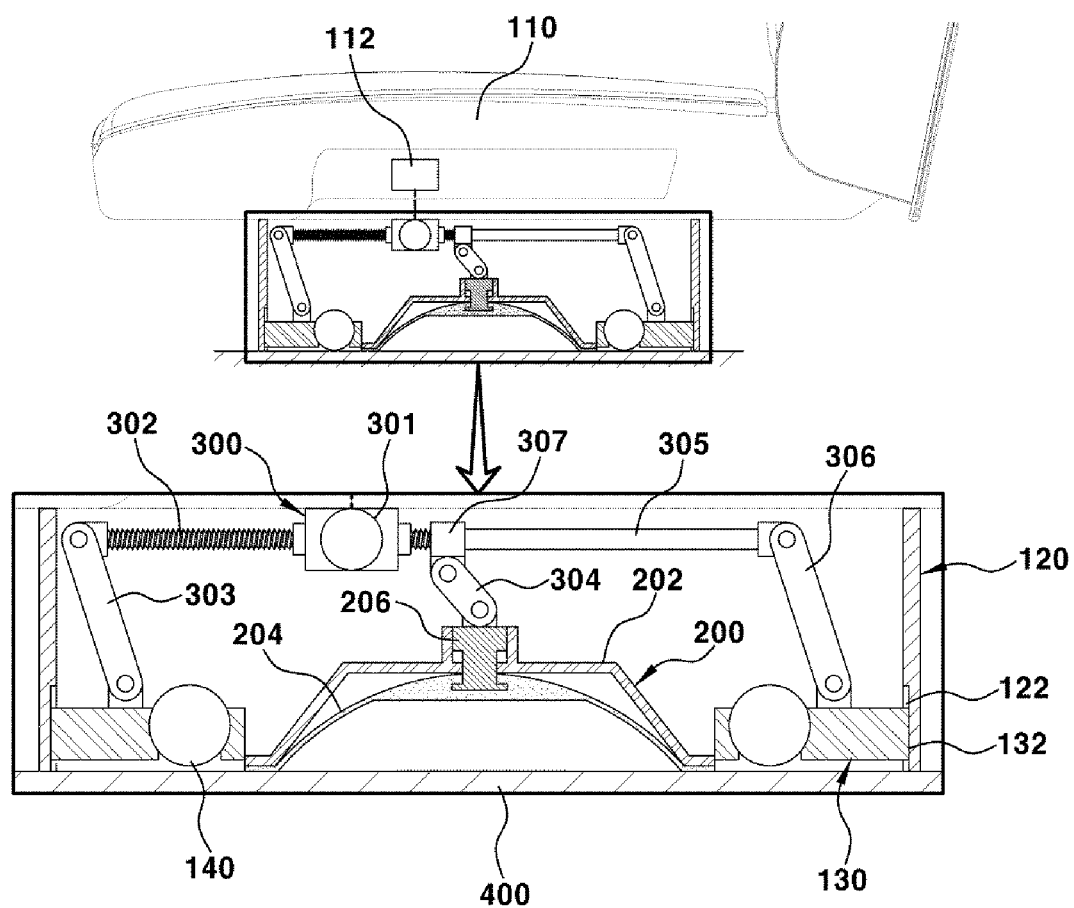

MOVING AND LOCKING DEVICE FOR VEHICLE SEAT

CROSS REFERENCE TO RELATED APPLICATION

The present application claims priority to the benefit of Korean Patent Application No. 10-2020-0109973, filed Aug. 31, 2020 in the Korean Intellectual Property Office, the entire contents of which is incorporated herein for all purposes by this reference.

TECHNICAL FIELD

The present disclosure relates to a moving and locking device for a vehicle seat. More particularly, the present disclosure relates to a moving and locking device for a vehicle seat, the device being capable of freely moving a vehicle seat to a desired position on a floor panel inside the vehicle and of locking the seat with a vacuum adsorption force.

BACKGROUND

An autonomous vehicle is mounted with a seat that can linearly move back and forth and can rotate to provide user-friendly environments for multi-party conferences, conversations, resting, viewing of the outside landscape, and the like.

For this, a base frame of each seat is mounted on a rail installed on the floor panel in a manner to linearly move back and forth, and a seat frame integrated with the seat is mounted on the base frame in a manner to swivel.

Therefore, a passenger can linearly move his or her seat to the desired position in a back-and-forth direction and swivel in the desired direction.

However, there is a limit to freely moving the seat to the desired position inside the vehicle only by moving the seat back and forth or swiveling.

Therefore, an autonomous vehicle is required to be equipped with: a customized seat that can change the interior space thereof into an office, a living room, a resting room for resting and watching videos, or the like; and a moving and locking mechanism for freely moving and locking the customized seat at the desired position.

In addition, considering the point that a personal mobility for moving a short distance is popularly used, an autonomous vehicle is required to be equipped with a fastening mechanism that can fasten a personal mobility to the vehicle so that the personal mobility can be used as a seat when the user travels a long distance.

SUMMARY

The present disclosure has been made in view of the problems occurring in the related art, and an objective of the present disclosure is to provide a moving and locking device for a vehicle seat, the moving and locking device being installed under the vehicle seat and composed of a moving device and a vacuum adsorption device, thereby freely moving the vehicle seat to a desired position on a floor panel inside the vehicle and securely locking the vehicle seat at the desired position with a vacuum adsorption force generated by the vacuum adsorption device.

In order to achieve the above objective, the present disclosure provides a moving and locking device for a vehicle seat, the moving and locking device including: a lower frame attached to a lower surface of a seat cushion of the seat which is configured to be moved; a plurality of wheels a plurality of wheels disposed on a bottom surface of the lower frame, the plurality of wheels configured to roll on a floor panel; and a vacuum adsorption device disposed inside the lower frame. The seat can be moved to a desired position on the floor panel through the rolling motion of the wheels, and then the seat can be locked at the position by a vacuum adsorption force generated by the vacuum adsorption device.

The lower frame may be mounted with one wheel frame that is installed in a vertically movable manner, and the plurality of wheels may be mounted on the wheel frame at regular intervals.

The vacuum adsorption device may include: a cover disposed in a center portion an inside area of the lower frame; a vacuum adsorption pad disposed inside the cover in a manner to be adsorbed onto the floor panel by vacuum force; and a vacuum operation bar having an upper end portion disposed on the cover and a lower end portion connected to the vacuum adsorption pad.

When the vacuum operation bar is pulled up, the vacuum operation pad connected to the vacuum operation bar may be raised, a vacuum pressure may be generated between the floor panel and the vacuum operation pad, the vacuum adsorption pad may come into tight contact with the floor panel and may be vacuum-adsorbed, and a bottom surface of the lower frame is supported on the floor panel.

In addition, a drive device for causing a vacuum adsorption operation of the vacuum adsorption device may be mounted in the lower frame.

According to one embodiment of the present disclosure, the drive device may include: a motor mounted in the lower frame; a lead screw fastened to a gearbox of the motor in a manner to be linearly movable; a first link hinged to a first end of the lead screw at an upper portion thereof and hinged to a front end of the wheel frame at a lower end thereof; a second link hinged to a second end of the lead screw at an upper end thereof and hinged to an upper portion of the vacuum operation bar at a lower end thereof; a horizontal shaft extending from the second end portion of the lead screw; and a third link hinged to a rear end of the horizontal shaft at an upper end thereof and hinged to a rear end of the wheel frame.

In addition, a sliding extension is formed on an external surface of the wheel frame and a sliding groove is formed on an internal surface of the lower frame, and the sliding extension vertically slides in the sliding groove.

In addition, the second end of the lead screw is provided with a fixing bracket for fastening the lead screw to the second link.

A switch operated to apply an electric current to the motor is mounted on one side surface of the seat cushion.

Various aspects of the present disclosure provide the effects described below through the above-described problem solving means.

First, a vehicle seat can be freely moved to a desired position inside a vehicle.

Second, the vehicle seat moved to the desired position can be securely flocked at the desired position on a floor panel by a vacuum adsorption force.

Third, since the vehicle seat can be freely moved to the desired position inside the vehicle and can be securely locked to the floor panel, the position of the vehicle seat can be freely adjusted in the vehicle when the moving and locking device is applied to an autonomous vehicle.

BRIEF DESCRIPTION OF THE DRAWINGS

FIG. 1 is a perspective view illustrating the appearance of a moving and locking device for a vehicle seat, according to one embodiment of the present disclosure;

FIG. 2 is a perspective view illustrating a moving and locking device for a vehicle seat according to one embodiment of the present disclosure, the moving and locking device being in a state in which a vacuum adsorption device is connected to a wheel frame;

FIG. 3 is a vertical cross-sectional view illustrating the moving and locking device in a state in which a vacuum adsorption operation is not yet performed; and FIG. 4 is a vertical cross-sectional view illustrating the moving and locking device in a state in which the vacuum adsorption operation is performed.

DETAILED DESCRIPTION OF THE EMBODIMENTS

Hereinbelow, exemplary embodiments of the present disclosure will be described in detail with reference to the accompanying drawings.

FIG. 1 is a perspective view illustrating the appearance of a moving and locking device for a vehicle seat, according to one embodiment of the present disclosure, and FIG. 2 is a perspective view illustrating a moving and locking device according to one embodiment of the present disclosure, the view especially showing a state in which a drive device is assembled with a vacuum adsorption device and a wheel frame.

As illustrated in FIG. 1, a lower frame 120 is mounted underneath a seat cushion 110 of a seat 100.

In addition, a plurality of wheels 140 are attached to a lower end portion of the lower frame 120. The wheels 140 perform rolling motion on the surface of a floor panel 400.

A vacuum adsorption device 200 that can be adsorbed onto the surface of the floor panel 400 by vacuum force is disposed inside the lower frame 120.

The seat 100 can easily move to a desired position on the floor panel 400 through rolling motion of the wheels 140. When the seat 100 reaches the desired position, the seat 100 can be securely locked at the desired position on the floor panel 400 by the action of the vacuum adsorption device 200.

For this, a ring-shaped wheel frame 130 is installed on the internal surface of the lower frame 120 in a manner to be vertically movable, and the plurality of wheels 140 are coupled to the bottom of the wheel frame 130 at regular intervals.

When the seat 100 is pushed in a direction, the seat 100 moves to the desired position along the surface of the floor panel 400 by the rolling motion of the wheels 140 coupled to the bottom of the wheel frame 130.

According to one embodiment of the present disclosure, the vacuum adsorption device 200 includes: a cover 202 made of a metallic material and disposed in the center of the lower frame 120; a vacuum adsorption pad 204 disposed in the cover 202 and adsorbed onto the surface of the floor panel 400 by vacuum force; and a vacuum operation bar 206 that is engaged with an upper portion of the cover 202 at an upper end thereof and is integrally coupled to the vacuum adsorption pad 204 while passing through the cover 202.

In particular, a drive device 300 for driving the vacuum adsorption device 200 is mounted in the lower frame 120.

In other words, the drive device 300 mounted in the lower frame 120 is configured to lift the wheel frame 130 so that the wheels 140 are spaced from the surface of the floor panel 400 and to pull the vacuum operation bar 206 upward with the vacuum adsorption pad 204 adsorbed onto the surface of the floor panel 400.

According to one embodiment of the present disclosure, the drive device 300 includes: a motor 301 fixed to an upper portion of the lower frame 120; a lead screw 302 horizontally arranged and fastened to a gearbox of the motor 301 in a manner to be linearly movable; a first link 303 hinged to a first end of the lead screw 302 at an upper end thereof and hinged to a front end of the wheel frame 130 at a lower end thereof; and a second link 304 hinged to a second end of the lead screw 302 at an upper end thereof and hinged to the upper end of the vacuum operation bar 206 at a lower end thereof.

In addition, the drive device 300 further includes a horizontal shaft 305 horizontally extending from the second end of the lead screw 302, and a third link 306 hinged to a rear end of the horizontal shaft 305 at an upper end thereof and hinged to a rear end of the wheel frame 130.

A fixing bracket 307 for fastening the lead screw 302 to the second link 304 in a hinged manner may be mounted on the second end of the lead screw 302. The horizontal shaft 305 horizontally extends from the fixing bracket 307.

In order for the wheel frame 130 to be vertically movable along the inside surface of the lower frame 120, an outer portion of the wheel frame 130 is provided with a sliding extension 132, and an inner portion of the wheel frame 130 is provided with a sliding groove 122 through which the sliding extension 132 can slide in the sliding groove.

A power switch 112 for applying or blocking current to the motor 301 of the drive device 300 is mounted on a side surface of the seat cushion 110.

Here, an operation flow of the moving and locking device structured as described above will be described below.

FIG. 3 is a vertical cross-sectional view illustrating a state in which the moving and locking device according to the present disclosure is not yet operated.

As illustrated in FIG. 3, before a vacuum adsorption operation of the vacuum adsorption device 200 is started, the wheels 140 are in a contact state with the surface of the floor panel 400 so that the wheels 140 can roll along the surface of the floor panel 400.

In addition, before the vacuum adsorption operation of the vacuum adsorption device 200 is started, the first link 303, the second link 304, and the third link 306 are arranged in a vertical direction.

In addition, before the vacuum adsorption operation of the vacuum adsorption device 200 is started, the sliding extension 132 of the wheel frame 130 is positioned in a lower portion of the sliding groove 122 of the lower frame 120.

In this state, the level of the vacuum adsorption pad 204 of the vacuum adsorption device 200 is higher than that of the wheels 140. That is, the vacuum adsorption pad 204 is distanced from the floor panel 400.

In this state, when a user pushes the seat 100 in a desired direction, the wheels 140 mounted on the wheel frame 130 roll in the direction because they are in contact with the surface of the floor panel 400. Therefore, the seat 100 can be easily moved to the desired position on the floor panel 400 by the rolling motion of the wheels 140.

FIG. 4 is a cross-sectional view showing a state in which the vacuum adsorption operation of a moving and locking device according to the present disclosure is started.

After the seat 100 is moved to the desired position on the floor panel 400 by rolling motion of the wheels 140, the seat 100 needs to be securely locked for the safety of a passenger.

For this, when a user presses a first portion of the switch 112, an electric current is applied to the motor 301 so that the motor 301 rotates in one direction (for example, forward) and the resulting forward torque of the motor is transferred to the gearbox. This makes the lead screw 302 engaged with an output gear linearly move forward, and thus the horizontal shaft 305 extending from the lead screw 302 also linearly moves forward.

As a result, as shown in FIG. 4, the first link 303 hinge-fastened to the first end of the lead screw 302 angularly rotates forward at the hinged point on the wheel frame 130, and the second link 304 hinge-fastened to the second end of the lead screw 302 angularly rotates forward, and the third link 306 hinge-fastened to the horizontal shaft 305 also angularly rotates forward.

At this time, since the lower-end hinged point (point hinged to the wheel frame 130) of the first link 303 is raised the forward rotation of the first link 303, the front end of the wheel frame 130 is pulled upward. At the same time, the lower-end hinged point (point hinged to the wheel frame 130) of the third link 306 is raised due to the forward rotation of the third link 306, the rear end of the wheel frame 130 is also pulled upward.

Accordingly, when the sliding extension 132 of the wheel frame 130 slides upward in the sliding groove 122 of the lower frame 120, the front end portion and the rear end portion of the wheel frame 130 vertically move upward together.

In this way, as the wheel frame 130 is raised, the wheels 140 mounted on the wheel frame 130 are spaced from the floor panel 400. At this time, the cover 202 and the vacuum adsorption pad 204 of the vacuum adsorption device 200 descend due to gravity, and the vacuum adsorption pad 204 comes into tight contact with the surface of the floor panel 400.

At this time, when the read screw 302 linearly moves forward and the second link 304 angularly rotates forward, the lower-end hinged point of the second link 304 coupled to the vacuum operation bar 206 in a hinged manner is raised, thereby pulling the vacuum operation bar 206 upward.

When the vacuum operation bar 206 is pulled upward, the vacuum operation pad 204 connected to the vacuum operation bar 206 is elevated. At this time, a vacuum pressure is generated between the surface of the floor panel 400 and the bottom surface of the vacuum adsorption pad 204 so that the vacuum adsorption pad 204 is adsorbed on the surface of the floor panel 400.

That is, the seat 100 is moved to the desired position on the floor panel 400, and the vacuum adsorption pad 204 is adsorbed on the floor panel by vacuum force, so that the seat 100 is securely locked at the desired position.

When the vacuum adsorption pad 204 is adsorbed on the floor panel 400, the bottom surface of the lower frame 120 is supported on the floor panel 400 so that the orientation of the seat 100 is securely maintained.

On the other hand, when a user presses a second portion of the switch 112, an electric current is applied to the motor 301 so that the motor rotates in the reverse direction. The reverse torque of the motor 301 is transferred to the gearbox. This makes the lead screw 302 engaged with the output gear inside the gearbox linearly move backward, and the horizontal shaft 305 connected to the lead screw 302 also linearly moves backward. That is, the reverse operation occurs. As a result, the vacuum adsorption of the vacuum adsorption pad 204 is released, and the wheels 140 are lowered to come into contact with the floor panel 400 to perform rolling motion on the floor panel again.

On the other hand, even though the wheels 140 are directly mounted to the lower frame so as to perform rolling motion, and the bottom of the seat cushion is directly equipped with a hydraulic or pneumatic cylinder, a solenoid, or the like as a drive device for vertically elevating the vacuum adsorption device, the vacuum adsorption device is lowered to be vacuum-adsorbed on the floor panel 400 by operating the hydraulic or pneumatic cylinder or the solenoid adopted as the drive device after the seat is moved through the rolling movement of the wheels 140.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A moving and locking device for a vehicle seat, the moving and locking device comprising:
   a lower frame disposed on a bottom surface of a seat cushion of the seat which is configured to be moved;
   a plurality of wheels disposed on a bottom surface of the lower frame, the plurality of wheels configured to move in a roll motion on a floor panel; and
   a vacuum adsorption device disposed inside the lower frame and configured to be adsorbed on the floor panel by vacuum force,
   wherein, when the seat is moved to a desired position on the floor panel by the rolling motion of the plurality of wheels, the seat is configured to be locked to the floor panel at the desired position by the vacuum adsorption device being raised and generating a vacuum pressure between the floor panel and the vacuum adsorption device.

2. The moving and locking device according to claim 1, wherein the lower frame includes a wheel frame that is configured to be vertically movable, and
   wherein the plurality of wheels are disposed to be spaced part on a bottom surface of the wheel frame at a predetermined interval.

3. The moving and locking device according to claim 1, wherein the vacuum adsorption device comprises:
   a cover disposed in a center portion of an inside area of the lower frame;
   a vacuum adsorption pad disposed inside the cover and configured to be vacuum-adsorbed on the floor panel; and
   a vacuum operation bar having:
   a first end engaged with an upper portion of the cover; and
   a second end connected to the vacuum adsorption pad.

4. The moving and locking device according to claim 3, wherein, when the vacuum operation bar is pulled upward, the vacuum operation pad connected to the vacuum operation bar is configured to be raised and a vacuum pressure is generated between the floor panel and the vacuum operation pad so that the vacuum operation pad is vacuum-adsorbed on the floor panel.

5. The moving and locking device according to claim 3, wherein the bottom surface of the lower frame is configured to be supported on the floor panel when the vacuum adsorption pad is adsorbed on the floor panel by vacuum force.

6. The moving and locking device according to claim 1, further comprising a drive device disposed in the lower frame and configured to drive the vacuum adsorption device.

7. The moving and locking device according to claim 6, wherein the drive device comprises:
a motor disposed in the lower frame;
a lead screw configured to be fastened to a gearbox of the motor in a linearly movable manner;
a first link having:
a first portion hinged to a first end of the lead screw; and
a second portion hinged to a front end of the wheel frame;
a second link having:
a first portion hinged to a second end of the lead screw; and
a second portion hinged to the vacuum operation bar engaged with an upper portion of the cover of the vacuum adsorption device;
a horizontal shaft extending from the second end of the lead screw; and
a third link having:
a first portion hinged to a rear end of the horizontal shaft; and
a second portion hinged to a rear portion of the wheel frame.

8. The moving and locking device according to claim 7, wherein a sliding extension protrudes outwardly on an external surface of the wheel frame and a sliding groove is defined to be recessed on an internal surface of the lower frame, such that the sliding extension is configured to be vertically slidable in the sliding groove.

9. The moving and locking device according to claim 7, wherein the lead screw has a fixing bracket at the second end of the lead screw, the fixing bracket configured to fasten the lead screw and the second link to each other in a hinged manner.

10. The moving and locking device according to claim 1, further comprising a switch on a side surface of the seat cushion and configured to be operated to apply an electric current to the motor of the drive device.

* * * * *